No. 653,980. Patented July 17, 1900.
A. D. BAIRD & O. SCHELLERT.
CREAM SEPARATOR.
(Application filed Apr. 10, 1900.)

(No Model.)

WITNESSES:
Wm E Thompson
Wm H Payne

INVENTORS:
Aaron D. Baird,
Otto Schellert.
By E. T. Silvius,
ATTORNEY.

THE NORRIS PETERS CO., PHOTO-LITHO., WASHINGTON, D. C.

UNITED STATES PATENT OFFICE.

AARON D. BAIRD AND OTTO SCHELLERT, OF INDIANAPOLIS, INDIANA.

CREAM-SEPARATOR.

SPECIFICATION forming part of Letters Patent No. 653,980, dated July 17, 1900.

Application filed April 10, 1900. Serial No. 12,302. (No model.)

*To all whom it may concern:*

Be it known that we, AARON D. BAIRD and OTTO SCHELLERT, citizens of the United States, residing at Indianapolis, in the county of Marion and State of Indiana, have invented certain new and useful Improvements in Cream-Separators; and we do declare the following to be a full, clear, and exact description of the invention, such as will enable others skilled in the art to which it appertains to make and use the same, reference being had to the accompanying drawings, and to the letters of reference marked thereon, which form a part of this specification.

Our invention relates to apparatus whereby cream may be separated from milk; and one object of the invention is to cheaply attain the highest efficiency in this operation, whereby a great saving may be effected when it is desired to obtain the maximum amount of cream from the milk, another object being to separate the cream from the milk in the shortest time possible.

The invention consists in a vessel and appliances connected therewith in a new and novel manner, whereby atmospheric air may either be cooled or be heated and forced into the milk at the bottom of the vessel in such manner as to thoroughly permeate the whole volume of milk, and thereby more effectually aid in separating the cream therefrom; and the invention consists, further, in the parts and combination and arrangement of parts hereinafter particularly described and claimed.

Figure 1:
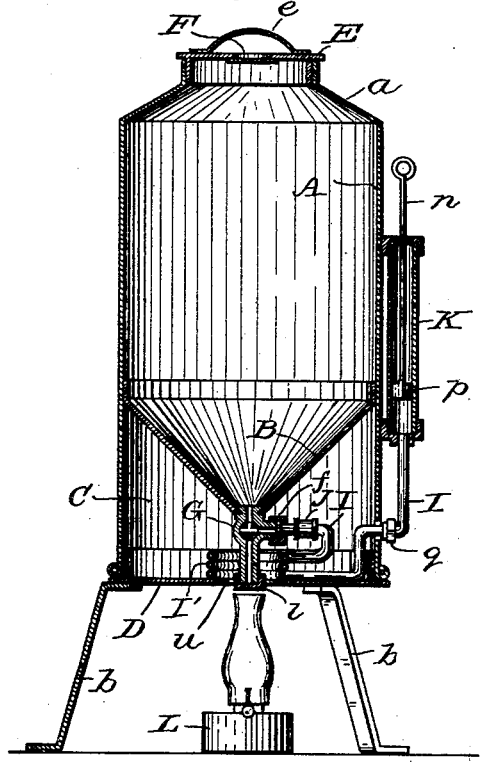
Figure 2:
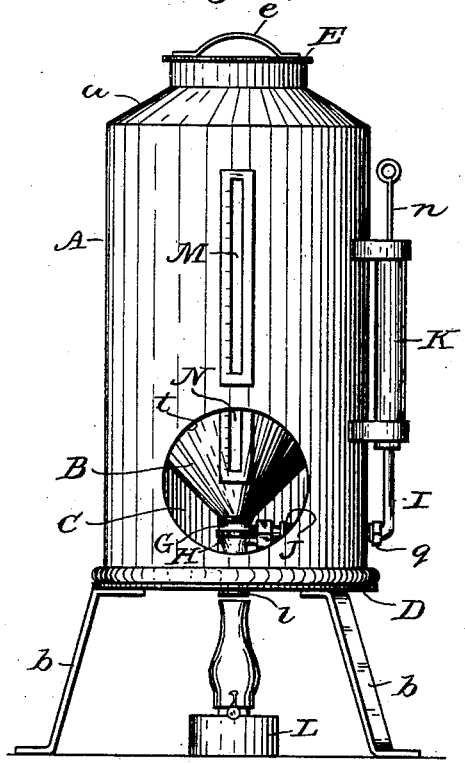
Figure 3:
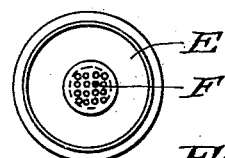
Figures 4, 5:
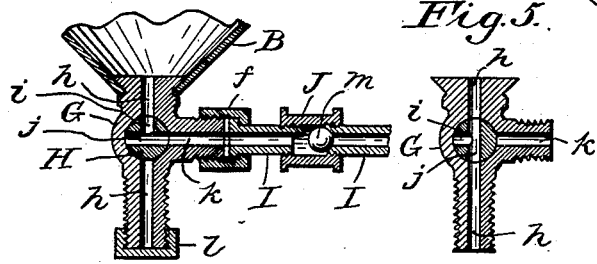
Figure 6:
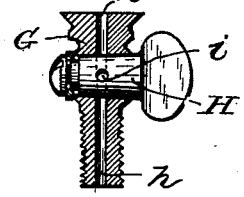

Referring to the drawings, Figure 1 represents a central vertical sectional view of our complete invention; Fig. 2, a front elevation, and Figs. 3, 4, 5, and 6 detail views.

In practically carrying out our invention we construct a suitable vessel A, in which the new milk is to be placed for separation, and having an apertured top $a$, to which a cover E, having a handle $e$, is fitted and provided with a screened vent-aperture F. The bottom B of the vessel is constructed somewhat in the form of an inverted cone or, properly, a funnel, at the center of which is secured a suitable valve or a plug-cock G. The walls of the vessel A extend below the bottom B a suitable distance, providing a chamber C, having at the front an aperture $t$. The chamber A and the bottom B are preferably provided with glass-covered sight-apertures M and N in the walls thereof, extending vertically. A suitable base D, having supporting-legs $b$, is provided, upon which the lower edges of the walls of the chamber C may rest, and the base has a central aperture $u$.

The body of the cock G has a duct $h$ extending vertically therethrough and communicating with the interior of the vessel A, and at the lower end thereof a cap $l$ may be applied. The valve-body also has a duct $k$ at a right angle to the duct $h$. The plug H has a transverse passage $j$ extending therethrough and also a passage $i$ from the exterior of the plug to the passage $j$, so that by rotating the plug communication may be made either directly through the duct $h$ or through the upper part of the duct $h$ and the duct $k$. A pipe-duct I is connected by a union $f$ to the branch having the duct $k$ and extends as a coil I' about the lower end of the cock G or below the same and thence through the wall of the chamber C to the exterior thereof and is connected to a suitable air-pump K, secured to the vessel A, and having a piston-rod $n$ and a suitable piston $p$. A union $q$ is preferably employed in connecting the pipe I with the pump K. Near the union $f$ the pipe I is provided with a suitable self-acting check-valve J, the valve $m$ proper of which is preferably a ball suitably seated to automatically prevent the milk from entering the pipe-line and the air-pump. In some cases the coil I' may be dispensed with and the pipe-line be connected as a direct section between the check-valve J and an air-pump. A suitable removable lamp L is provided and situate beneath the aperture $u$, so that heat therefrom may ascend within the coil I' for the purpose of heating the air which is forced by the air-pump into the vessel A. Where convenient, obviously a gas-jet may be substituted for the lamp. A suitable door may be arranged at the aperture $t$.

In practical use, the cock G having been closed, the lid E may be removed and the vessel A filled with milk or with any desired quantity thereof and the lid then replaced. When convenient, the warm milk may be taken immediately after a milking or if allowed to cool it may be again warmed before putting it into the vessel. Should the milk be cool when placed in the separator, the lamp L is employed for heating the air which is to be introduced into the milk; but when the milk is warm the lamp should be removed, and should the atmospheric air be warm ice should be packed upon the base D and about the coil I' for cooling the air, as it is highly important that there be considerable difference in temperatures as between the milk and the air introduced therein. In cool weather the ice may not be required. Having charged the separator, the plug H may be rotated, so as to open communication between the pump and the vessel A, as in Figs. 1 and 4, and the pump being operated air is forced into the center of the bottom B of the vessel, the diverging sides of which permit the air to spread out beneath the whole or the greater part of the milk at the bottom, and ascending becomes thoroughly mixed with the whole volume of milk, which is then allowed to remain a suitable length of time until the cream is entirely separated therefrom, the sight-apertures enabling one to ascertain when it is completed. The plug H is then turned so as to cut off the connection with the pump and open the duct $h$ entirely, and the cap $l$ having first been removed the milk may be drawn off, a pail being set in place of the lamp. The cream may then be removed from the top of the vessel.

Having thus described our invention, what we claim as new, and desire to secure by Letters Patent, is—

1. A cream-separator including a vessel provided with a cock or valve attached to the bottom thereof and having a passage-way or duct communicating with the vessel and the atmosphere, and having also a lateral duct communicating with the first-described duct; a self-acting valve connected to the cock in communication with the lateral duct; and means whereby communication may be opened between the self-acting valve and the vessel, or between the self-acting valve and the atmosphere, or between the vessel and the atmosphere.

2. A cream-separator including a separating vessel, a three-way cock attached to the bottom of the vessel and having a cap removably attached to one of the ducts thereof, a check-valve connected to another one of the ducts of said cock, a coiled pipe-duct connected to said check-valve and extending about the duct of said cock having the cap thereon, a base, and legs attached to the base.

3. A cream-separator including a separating vessel having a chamber below the bottom thereof, a three-way cock attached to the bottom of said vessel and situate in said chamber, a removable cap on said cock and situate below said chamber, a check-valve situate in said chamber and connected with said cock, a pipe-duct connected to said check-valve and coiled about said cock within said chamber, a pump connected with said pipe-duct, a base supporting said vessel and having an aperture coinciding with the circle described by said coil, and legs attached to said base.

4. In a cream-separator, the combination with the milk-retaining vessel having the funnel-shaped bottom and the chamber below such bottom, of the cock attached to such bottom and situate within such chamber, said cock having a vertical duct therethrough and a lateral duct communicating with the vertical duct; the pipe-duct detachably connected with said lateral duct, the self-acting valve connected with said pipe-duct, and the pump connected with said valve, substantially as set forth.

5. In a cream-separator, the combination of the separating vessel, the cock attached to the bottom of the vessel, the check-valve connected to said cock, the coiled pipe-duct attached to the check-valve, the base below said coiled pipe-duct, and a support for the base.

6. In a cream-separator, the combination of the separating vessel having the chamber below the bottom thereof, and provided with the aperture in the wall forming the chamber; the cock, the check-valve and the removable union between the cock and the check-valve situate in said chamber within range of said aperture; and the pipe-duct connected to said check-valve; substantially as set forth.

In testimony whereof we affix our signatures in presence of two witnesses.

AARON D. BAIRD.
OTTO SCHELLERT.

Witnesses:
WM. H. PAYNE,
E. T. SILVIUS.